(12) United States Patent
O'Malley et al.

(10) Patent No.: US 10,558,740 B1
(45) Date of Patent: Feb. 11, 2020

(54) SERVING DIFFERENT VERSIONS OF A USER INTERFACE IN RESPONSE TO USER EMOTIONAL STATE

(71) Applicant: INTUIT INC., Mountain View, CA (US)

(72) Inventors: Damien O'Malley, San Diego, CA (US); Nankun Huang, San Diego, CA (US); Amir Eftekhari, San Diego, CA (US); Yao Morin, San Diego, CA (US); Joseph Elwell, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 21 days.

(21) Appl. No.: 15/456,751

(22) Filed: Mar. 13, 2017

(51) Int. Cl.
*G06F 3/00* (2006.01)
*G06F 17/22* (2006.01)

(52) U.S. Cl.
CPC ............................... *G06F 17/2288* (2013.01)

(58) Field of Classification Search
CPC ........................... G06F 3/0482; G06F 17/2288
USPC ............................................ 715/866, 744, 747
See application file for complete search history.

(56) References Cited

U.S. PATENT DOCUMENTS

| 7,930,676 | B1 * | 4/2011 | Thomas | G06F 9/44505 706/45 |
|---|---|---|---|---|
| 2006/0170945 | A1 * | 8/2006 | Bill | H04L 29/06 358/1.13 |
| 2008/0059570 | A1 * | 3/2008 | Bill | G06Q 10/10 709/203 |

* cited by examiner

*Primary Examiner* — Andrey Belousov
(74) *Attorney, Agent, or Firm* — Patterson + Sheridan, LLP (57) ABSTRACT

The present disclosure relates to dynamically generating user interfaces based on a user's emotional state. An example method generally includes a computer system receiving emotional response data from a client device. The computer system identifies a version of a user experience to present on the client device based on the received emotional response data and generates code for rendering a user interface associated with the identified version of the user experience. The generated code is transmitted to the client device for rendering and presentation on the client device.

20 Claims, 7 Drawing Sheets

SERVING DIFFERENT VERSIONS OF A USER INTERFACE IN RESPONSE TO USER EMOTIONAL STATE

BACKGROUND

Field

Aspects of the present disclosure relate to generating user interfaces for computer systems, and more specifically to dynamically generating user interfaces based on a detected emotional response to events displayed in an application executing on a computer.

Description of the Related Art

User interfaces have been developed to allow users of a software application executing on a computer system to view data generated by the computer system or a remote system connected to the computer system and input data into the computer system or remote system for processing. User interfaces may range from text-based user interfaces (TUIs) used in command-line or console-based applications, which were historically used before the advent of graphical user interfaces (GUIs), to graphical user interfaces (GUIs) used for programs developed for desktop computers, laptops, tablets, smartphones, or other computing devices. The data displayed in a user interface for a specific application may change over time as the user of the application interacts with the application, modifies data used by the application, or otherwise modifies the operating state of the application (e.g., moving from one step of a user interaction workflow to a different step of the workflow).

GUIs generally display a plurality of graphical elements, such as buttons, drop down menus, radio buttons from which a single option from a group of options may be selected, check boxes that allow for the selection of multiple options, text boxes for displaying textual content to a user, event handlers defining when and how an application responds to user interaction, and the like. Each element displayed in a GUI may define, for example, the data that can be displayed in each element, formatting rules for each element (e.g., text justification, text font, text color, background color, background transparency, and so on), whether users can interact with an element, actions that a software application may perform in response to user interaction, and so on. GUIs may be implemented, for example, in applications that execute on a computing device or as a set of web components on web pages provided to a user's computing system for display in a web browser.

In some GUIs, the content displayed in the graphical elements may be pre-defined for each step of a processing flow. For example, for a GUI for a processing flow that is relatively linear, a predefined user interface with predefined content may be presented to a user for each step of the processing flow. In other GUIs, different user interfaces may be defined for different states of a processing flow or different inputs provided by a user to the software application. For example, a first user interface layout may be defined if a user provides input in the affirmative, while a second user interface layout may be defined if a user provides input in the negative.

SUMMARY

One embodiment of the present disclosure includes a method for dynamically generating a user interface based on a detected emotional response. The method generally includes receiving emotional response data from a client device. The computer system identifies a version of a user experience to present on the client device based on the received emotional response data and generates code for rendering a user interface associated with the identified version of the user experience. The generated code is transmitted to the client device for rendering and presentation on the client device.

Another embodiment provides a computer-readable storage medium having instructions, which, when executed on a processor, performs an operation for dynamically generating a user interface based on a detected emotional response. The operation generally includes receiving emotional response data from a client device. The computer system identifies a version of a user experience to present on the client device based on the received emotional response data and generates code for rendering a user interface associated with the identified version of the user experience. The generated code is transmitted to the client device for rendering and presentation on the client device.

Still another embodiment of the present invention includes a processor and a memory storing a program, which, when executed on the processor, performs an operation for dynamically generating a user interface based on a detected emotional response. The operation generally includes receiving emotional response data from a client device. The computer system identifies a version of a user experience to present on the client device based on the received emotional response data and generates code for rendering a user interface associated with the identified version of the user experience. The generated code is transmitted to the client device for rendering and presentation on the client device.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

DETAILED DESCRIPTION

Applications, such as tax preparation software or other financial software, may generate results that are outside a range of values that a user of the application expects to see. For example, a tax preparation application may generate a tax refund amount that is less than an amount that a user expects to receive or a tax liability amount that exceeds an amount that a user expects to pay. In such cases, a user may express a variety of negative emotions indicating, for example, anger, disgust, and the like. In other cases, a tax preparation application may generate a tax refund amount that exceeds an amount that a user expects to receive or a tax liability amount that is less than an amount that a user expects to pay. In these cases, the user may express a variety of positive emotions indicating, for example, excitement, happiness, and the like.

Computing devices on which these applications execute, such as smartphones, tablets, and laptop computers, often include user-facing cameras. These cameras can be used to capture images of a user while a user interacts with an application executing on the device. A captured image can be provided to a processing system that analyzes the captured image to determine the emotional response expressed by a user and provide, to a requesting system, an indication of whether the emotional response is a positive response (e.g., happy, exited, and the like) or a negative response (e.g., anger, confusion, disgust, and other similar responses).

Embodiments of the present disclosure provide methods for dynamically generating user interface content based on the emotional response displayed by a user in response to data displayed in the user interface. As discussed in further detail herein, a computing system can receive information about the emotional response of a user in response to data displayed on the user interface. A first user interface may be generated and transmitted to a user device to be displayed to a user if the user displays a positive emotional response, and a second user interface may be generated and transmitted to user device to be displayed to the user if the user displays a negative emotional response. The second user interface may, for example, include additional information relative to the first user interface to explain why a generated result was different from what a user expected the result to be (e.g., why a generated tax refund amount was less than an expected amount or why a generated tax liability amount exceeded an expected amount).

Figure 1:
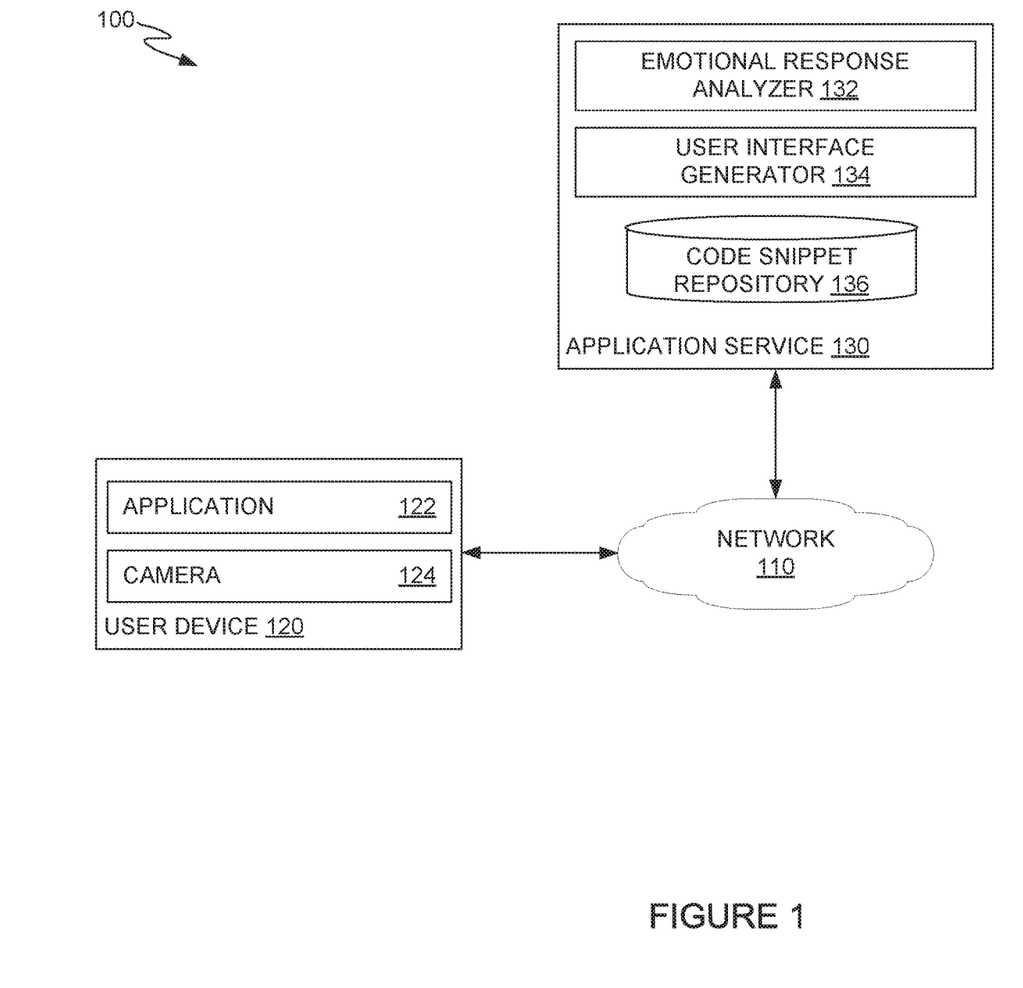
FIG. 1 illustrates an example computing environment, according to one embodiment.

FIG. 1 illustrates an example networked computing system, according to an aspect of the present disclosure. As illustrated, computing system includes a user device 120 and an application service 130, connected via network 110. Network 110, in general, may be a wide area network (WAN), local area network (LAN), wireless LAN (WLAN), personal area network (PAN), a cellular network, etc. In some aspects, network 110 may include a communications bus on a computing device such that application service 130 and the components thereof are local to an application executing on user device 120.

As illustrated, user device 120 includes an application 122 and a camera 124. User device 120 may represent a variety of computing devices, such as smartphones, tablets, laptop computers, and the like.

Application 122 generally displays one or more screens to a user of user device 120 to manipulate or otherwise interact with data and functionality provided by the application. Application 122 may be a native application or a web application provided to user device 120 by application service 130 and rendered in a web browser. A user may interact with application 122 using various input devices, such as touchscreens, keyboards, pointing devices (e.g., mice, pen-based input), imaging devices, voice input devices, gesture input detecting devices, and other input devices that a user can use to input data into the application. For example, the screens displayed by application 122 may allow a user to enter data for processing and modify or delete data previously entered into application 122.

In some cases, application 122 may store and process user-provided data locally (e.g., on user device 120). Such applications may store multiple versions of a user interface to display based on information about a user's emotional response to a result generated by the application 122, as discussed in further detail herein. In other cases, application 122 may transmit data to application service 130 for processing. For these applications, a user may enter data into one or more data entry fields provided by a user interface generated by application service 130 and displayed in application 122. As a user enters data into application 122, application 122 may, in some cases, continually update the results of a data calculation, such as the amount of a tax payment due from the user or a tax refund due to the user of application 122. For example, an update may be triggered by application 122 transmitting the user-provided data to application service 130. Application service 130 can update the results of the data calculation based on processing rules established for a workflow processed by application service 130, any previously-provided data for the workflow, and the newly-provided user data. In other cases, where application 122 performs calculation functions locally, application 122 need not transmit the user-provided data to application service 130 and may update the results of the data calculation based on processing rules defined in application 122, the previously-provided data, and the newly-provided data.

In response to a triggering event (e.g., indicated by application service 130 or predefined in application 122), application 122 can activate camera 124 to capture an image of the user's face. In some cases, application 122 can process the captured image locally to determine a user's emotional response to data displayed in application 122 and transmit an indication of the user's emotional response to application service 130 for processing (e.g., to determine the version of a user interface to display in application 122). In some cases, application 122 can process the user facial image remotely (e.g., by providing, via network 110, the captured image to application service 130 for processing).

To process the captured image and determine a user's emotional response to data displayed in application 122, application 122 evaluates facial attributes or visual cues of the user to generate emotion recognition data describing the user's emotional response to information presented in application 122. The emotion recognition data can include facial recognition data corresponding to different locations on the captured image of the user's face (e.g., eyes, eyebrows, lips, the forehead, and the like). The facial recognition data may indicate various facial attributes, such as whether the user has a raised eye brow, lip curl, nose wrinkle, and other visual cues that may indicate an emotional response of the user. For example, if application 122 determines that a user's facial expression shows eyebrows in closer proximity relative to a neutral expression, a wrinkled forehead, and/or pursed lips, application 122 can determine that the user is expressing a negative emotional response to data displayed in application 122. In another example, if application 122 determines that the user's facial expression includes smiling lips, crow's feet at the edges of the user's eyes, and the like, application 122 can determine that the user is expressing a positive emotional response to data displayed in application 122.

To determine the user's emotional response, application 122 can process the captured image using emotion recognition applications that can identify points on a user's face. These points may be facial regions associated with various anatomical structures that move differently for different facial expressions. The emotion recognition applications can detect displacements from a baseline (neutral) expression in various facial regions, such as the cheekbone region (e.g., to detect whether a user is smiling or frowning), at the edges of a user's eyes, eyelids, eyebrows, and the like. Based on the detected displacements in the various facial regions, the emotion recognition applications can generate one or more scores to represent the user's emotional response to the data displayed in application 122. These scores can, in some cases, indicate a degree of anger, contempt, joy, happiness, or other emotions displayed by the user.

In some cases, application 122 can generate a score representative of the user's emotional response based on the detected facial attributes. The scores may be generated by comparing the user's detected facial attributes to a generic data set or by comparing the user's detected facial attributes to a model generated for a specific user, as discussed in further detail below. In one example, a scoring range for the user's emotional response may use negative scores to represent a negative emotional response (e.g., anger, confusion, or the like) and positive scores to represent a positive emotional response (e.g., happiness, excitement, or the like). A score of 0 may indicate a neutral emotional response (e.g., that the user did not display any emotional response to the data displayed in application 122). For example, a score of 100 could represent an extremely positive reaction, while a score of −100 could represent an extremely negative reaction to the data displayed in application 122.

In some cases, application 122 can analyze a captured image to identify facial regions that have moved relative to a baseline model (e.g., a neutral emotional response) and an intensity of the movement. Application 122 can transmit data identifying the facial regions and associated intensity information for each facial region to application service 130 for processing, where application service 130 analyzes the identified facial regions and intensity information to generate an emotional response score.

In some cases, application 122 may include training features to generate a model of the various emotional responses of a user. By generating a user-specific model, application 122 can identify emotional responses relative to a neutral, or baseline, emotional response for that specific user. In one example, application 122 may generate the model of the various emotional responses of a user during a training phase that executes when a user launches application 122 for the first time. To generate the model, application 122 may capture images of the user for different emotional responses. For a user that displays a smaller range of facial characteristics, the model generated by application 122 may correlate small differences in facial attributes relative to a baseline, or neutral, emotional response to higher scores (e.g., indications of stronger emotional responses to the data displayed in application 122). Meanwhile, for a user that displays a larger range of facial characteristics, the model generated by application 122 may correlate small differences in facial attributes relative to a baseline emotional response to lower scores (e.g., indications of weaker emotional responses to the data displayed in application 122) and larger differences in facial attributes relative to the baseline emotional response to higher scores.

In other cases, application 122 can provide an emotional response model to application service 130 for use in selecting a version of a user interface to display to the user of user device 120. In response to a triggering event, application 122 can transmit a captured image to application service 130, and application service 130 can process the image and determine which version of a user interface to provide to application 122 for rendering and presentation to the user of user device 120 by comparing the user's emotional response against the emotional response model generated by application 122.

In some cases, application service 130 can generate the model of the various emotional responses of a user. In such a case, application service 130 can instruct application 122 to capture one or more images of the user for different emotional responses and transmit the captured images to application service 130 for processing. Application service 130 can generate a model based on comparisons of different expressions to a baseline, or neutral, emotional response. As discussed above, a model generated for a specific user can correlate small differences in facial attributes relative to a baseline, or neutral, emotional response to higher scores for users that display smaller ranges of facial characteristics and can correlate small differences in facial attributes to lower scores for users that display larger ranges of facial characteristics. Application service 130 may receive one or more images from user device 120, analyze the images based on the model generated for the user of user device 120, and determine the user's emotional response to the data displayed in application 122. As discussed in further detail below, application service can use the emotional response data determined from the one or more images to select a user experience to display to a user, generate code for rendering the user interface associated with the selected user experience, and transmit the generated code to user device 120 for rendering by application 122.

Camera 124 is generally configured to capture still images and video (or a stream of still images) of a user to generate a model of a user's emotional responses and when a triggering event occurs in application 122. Camera 124 may output video frames or a stream of images to a buffer in device memory while application 122 examines images for facial characteristics indicative of an emotional response. Application 122 can use the facial characteristics in an image to generate a model of a user's emotional responses during a training phase and can generate an emotional response score based on the presence or absence of different types of facial characteristics. While camera 124 captures video frames or a stream of still images, camera 124 may adjust focus, lighting, contrast, exposure settings, and other image capture parameters to attempt to obtain a clear image of the user that is interacting with application 122. Application 122 may, in some cases, continually adjust the camera settings until application 122 obtains a clear, usable image of the user from which application 122 and/or application service 130 can determine the user's emotional response.

Application service 130 generally receives data from user device 120, analyzes the received data, and generates the results of the workflow based on the received data. In some cases, application service 130 may be structured as a web service, with each step of the workflow being represented by a different web page or set of web components. For example, application service 130 may implement a tax preparation workflow that requests information about a user's income, dependents, and various deductible expenses and generates a tax return based on the received information./

As illustrated, application service 130 generally includes an emotional response analyzer 132, user interface generator 134, and code snippet repository 136. In some cases, where application service 130 receives image data from a user device 120 (e.g., images captured by camera 124 in response to a triggering event identified in application 122 or by application service 130), emotional response analyzer 132 can analyze the received image data to identify an emotional response displayed by the user in response to the triggering event. As discussed above, emotional response analyzer 132 can determine a user's emotional response to a triggering event, such as a calculation of a tax credit or tax liability, by comparing facial characteristics in a captured image to a baseline, or neutral, facial expression. Based on differences between a neutral facial expression and the facial expression depicted in the captured image, emotional response analyzer 132 can assign a score representing the user's emotional response to a triggering event. As discussed above, in some cases, a scoring model used to assign an emotional response score to a captured image may be generated on a per-user basis to accommodate for differences in how users express emotion. For example, for the same amount of change in facial characteristics, a scoring model for users that display limited changes in facial expression relative to a neutral expression may result in emotional response analyzer 132 assigning a higher score than emotional response analyzer 132 would for a user that displays more changes in facial expression relative to a neutral expression.

User interface generator 134 generally receives emotional response data from application 122 and/or emotional response analyzer 132 in response to a triggering event and uses the emotional response data to generate a version of a user interface for display on user device 120. The emotional response data may be a score representing the user's emotional response and may be received from application 122 (where application 122 processes a captured image) or emotional response analyzer 132 (where application service 130 receives an image or emotional response data from application 122 and processes the received image or emotional response data). The score, as discussed herein, may include negative scores that indicate that a user is displaying a negative response to the data displayed in application 122, positive scores that indicate that a user is displaying a positive response to the data displayed in an application 122, and a baseline score that indicates that a user is displaying a neutral response to the data displayed in an application 122. In some cases, user interface generator 134 can identify a triggering event at which application 120 is to capture an image of the user to be used in determining the emotional response of the user. Triggering events may be defined as part of a workflow implemented by application service 130. For example, if application service 130 implements a tax preparation workflow, various triggering events may be defined. These triggering events may include, for example, calculations of tax credits, determinations of eligibility for tax credits or deductions, and the like. In some cases, user interface generator 134 may include information identifying a triggering event in code for generating screens on user device 120. The triggering events may be included in an initial screen describing the triggering event (e.g., that application service will begin calculating an amount of a tax credit that a user may be entitled to), a screen indicating that application service 130 is performing the triggering event, and the like. In some cases, the triggering event may be defined as a screen displayed to a user before the results of processing a step in the workflow are displayed to a user.

In some cases, the triggering event may instruct user device 120 to begin capturing images of the user when the final results of processing the workflow step are completed. Upon capturing the image, application service 130 may receive a score calculated by the application 122 executing on user device 120 or may receive the captured image from user device 120 for emotional response analyzer 132 to analyze, as discussed above. Upon receiving a score representing the user's emotional response, user interface generator 134 can examine the score to determine which version of a user interface to display on user device 120. In some cases, the score representing a user's emotional response may be generated on a scale with negative scores representing a negative emotional response (e.g., anger, confusion, and the like) and positive scores representing a positive emotional response (e.g., happiness, excitement, and the like). User interface generator 134 can, in some cases, establish a positive emotional response threshold and a negative emotional response threshold.

Based on the emotional response score determined from an image captured by camera 124 in user device 120 in response to a triggering event, user interface generator 134 generates code for rendering a user interface in application 122 executing on user device 120. In some cases, the code for rendering a user interface may be generated from a plurality of code snippets stored in code snippet repository 136. The code may render a variety of graphical user interface (GUI) elements according to whether the user's emotional response is positive, negative, or neutral. The GUI components may include, for example, operating system and platform agnostic declarative code, HTML components, or other code that generates components that can be passed to user device 120 and rendered as a user interface in application 122. The GUI components may additionally include instructions executable by client systems or mobile devices to display a user interface or render an audible user experience on devices developed for an auditory interface. The GUI components may additionally include instructions executable by user device 120 to display a user interface using language-specific or operating system-specific GUI components (e.g., instructions for displaying Win32 form components, Aqua form components, KDE form components, similar components on other operating system platforms/desktop environments, Abstract Window Toolkit or Swing API components on the Java platform, and so on). Generally, instructions capable of rendering a GUI on user device 120 may include computer executable code generated from compiling and/or interpreting C (or variants thereof), Java, PHP, Ruby, HTML, JavaScript, Python, Asynchronous Java and XML (AJAX), VBscript, Extendable Application Markup Language (XAML), and other programming or scripting languages used to compose and present a visual, auditory, or tactile GUI.

In some cases, emotional response scores between the positive and negative emotional response thresholds may be deemed to be neutral emotional responses for which user interface generator 134 may, but need not, modify the generated user interface. Positive emotional response scores above the positive emotional response threshold may prompt user interface generator 134 to generate a first version of a user interface with additional information commensurate with the user's emotional response to the displayed data (e.g., an encouraging message, animations, and the like). In contrast, negative emotional response scores below the negative emotional response threshold may prompt user interface generator 134 to generate a second version of the user interface. The second version of the user interface may provide additional information to a user that explains how application service 130 generated the data displayed in application 122.

In some cases, user interface generator 134 may generate a user interface with additional components if a user displays a negative emotional response to a triggering event. For example, user interface generator 134 may establish a plurality of negative threshold scores and generate different user interfaces with different levels of detail for each negative threshold score. In some cases, the user interface may be generated by identifying the closest threshold score to the emotional response score received in response to the triggering event. A first negative threshold score may be defined, for example, for a mildly negative response (e.g., an emotional response score that indicates that the user is somewhat, but not extremely, unhappy about the results displayed in application 122). A user interface associated with the first negative threshold score may include GUI elements that provide a brief explanation of how application service 130 generated the result displayed in application 122. Progressively lower negative threshold scores may include GUI elements with additional details over a higher negative threshold score. A lowest negative threshold score, associated with an extremely negative response to the data displayed in application 122, may, for example, include one or more GUI elements for initiating a live conversation with a person that can explain the results of the workflow displayed in application 122 (e.g., a tax expert, if application service 130 provides a tax workflow to a user) or other interactive elements that explain how application service 130 generated the results displayed in application 122.

Code snippet repository 136 generally provides a repository in which code for generating GUI elements or components may be stored. Code for GUI elements stored in code snippet repository 136 may be associated with one or more versions of a user experience to be displayed to a user based on the user's emotional response to the results of a workflow step, as discussed above. For example, common GUI components, such as a basic form design and buttons for advancing to the next step in the workflow, may be shared by a plurality of versions of the user experience. Other GUI components, such as a live video component or other components that can be used to explain how application service 130 generated the displayed result of the workflow step, may be associated with one or more versions of a user experience generated in response to a negative emotional response to the displayed data.

Figure 2:
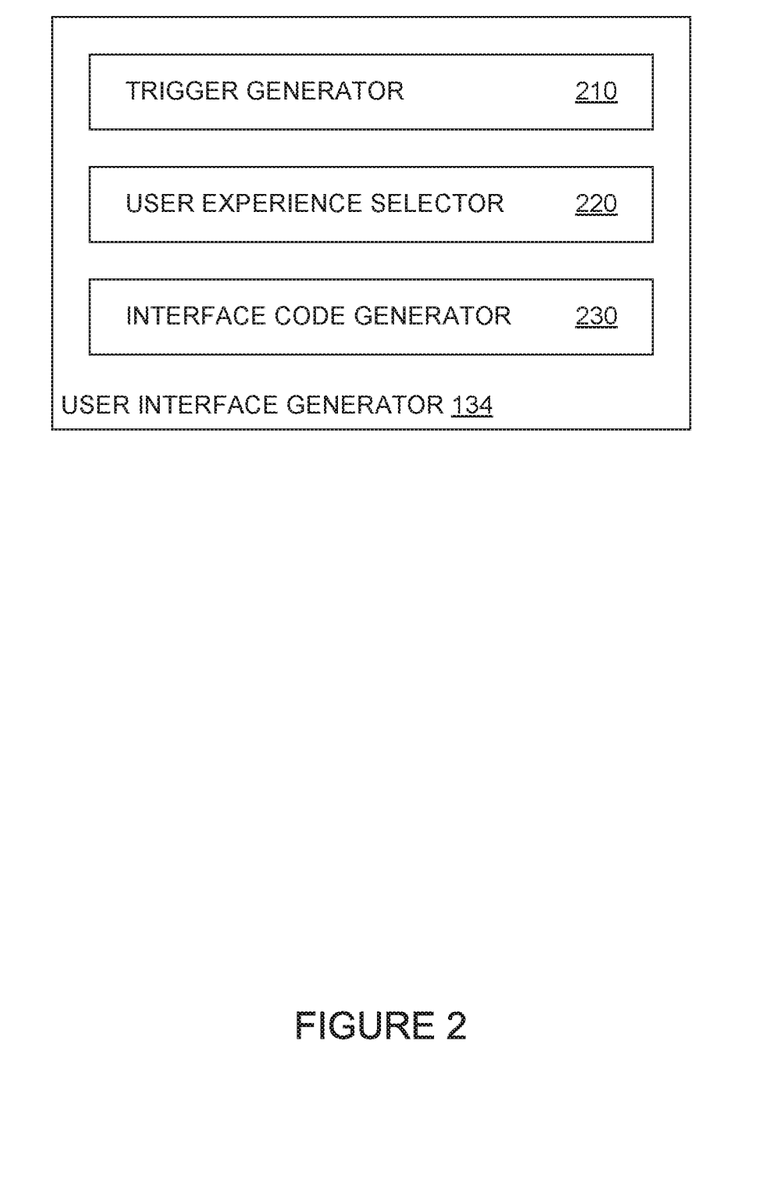
FIG. 2 illustrates an example user interface generator that generates user interfaces based on emotional response data, according to one embodiment.

FIG. 2 illustrates an example user interface generator 134, according to an embodiment. As illustrated, user interface generator 134 generally includes a trigger generator 210, a user experience selector 220, and an interface code generator 230.

Trigger generator 210 generally monitors a user's progress through a workflow to identify when a user has reached points in a workflow where application service 130 can present different versions of a user experience in response to a user's emotional response to a result generated by application service 130. In some cases, in a tax preparation workflow provided by application service 130, trigger generator 210 can determine that a user has reached a triggering event when the user begins calculating eligibility for various tax credits that can have a significant impact on the amount of a user's tax refund (e.g., the Earned Income Tax Credit) or where the user begins part of a workflow that determines whether the user is ineligible for various deductions (e.g., by being subject to Alternative Minimum Tax). When trigger generator 210 determines that a user has reached a point at which application service 130 can serve different versions of a user experience based on the user's emotional response, trigger generator 210 transmits an indication to application 122 indicating that application 122 is to begin capturing images of a user's face in order to capture data to be used to determine the user's emotional response. In some cases, the indication can indicate that application 122 is to begin capturing images at a specified time (e.g., a number of seconds after receiving the trigger) or begin capturing images after application 122 displays the calculated results of the workflow step being processed by application service 130.

User experience selector 220 generally receives data from the emotional response analyzer 132 about a user's emotional response to the results of a workflow step displayed in application 122 and uses the emotional response data to determine which version of the user experience to provide to the user. In some cases, as discussed above, user experience selector 220 can establish a plurality of threshold values that user experience selector 220 uses to determine which version of a user experience to present to a user. In one example, user experience selector 220 can define a single threshold value to compare the user's emotional response score against. Emotional response scores below the threshold value cause user experience selector 220 to select a first version of a user experience to present to a user, while emotional response scores above the threshold value cause user experience selector to select a second version of the user experience to present to the user. The first version of the user experience may include, for example, additional information explaining how application service calculated the result displayed in application 122 for the workflow step.

In some cases, user experience selector 220 can establish multiple threshold values to use in selecting the version of a user experience to provide to a user in response to a user's detected emotional response. For example, user experience selector 220 can establish a negative emotion threshold score and a positive emotion threshold score. If user experience selector 220 determines that the user's detected emotional response score is less than the negative emotion threshold score, user experience selector 220 can determine that user interface generator 134 is to present a first version of the user experience to a user of application 122. If the user's detected emotional response score is greater than the positive emotion threshold score, user experience selector 220 can determine that user interface generator 134 is to present a second version of the user experience to a user of application 122. If the user's detected emotional response score is between the negative emotion threshold score and the positive emotion threshold score, user experience selector 220 can determine that user interface generator 134 is to present a third version of the user experience to a user of application 122. The first version of the user experience may include information explaining how application service 130 calculated the result of the workflow step displayed in application 122. The second version of the user experience may include a message commensurate with the positive emotions displayed by the user. The third version of the user experience may be associated with a relatively neutral emotional response and need not include any additional information beyond the results of the workflow step displayed in application 122 and a button to proceed to the next step in the workflow.

In yet another case, user experience selector 220 can establish multiple negative emotional response score thresholds representing different degrees of a negative emotional response depicted by a user in response to the results of a workflow step illustrated in application 122. A negative emotional response threshold score associated with a mildly negative emotional response may prompt user experience selector 220 to select a first user interface for display in application 122. The first user interface may provide a brief explanation of how application service 130 generated the workflow result displayed in application 122. Negative emotional response threshold scores associated with progressively more intense negative emotional responses may prompt user experience selector 220 to select different user interfaces with more detailed explanations of how application service 130 generated the displayed result. The explanations may include links to detailed explanations of the rules for processing the workflow step, interactive user interface components that allow the user to interact with live support, and the like.

Interface code generator 230 generally receives information about a user experience selection determined by user experience selector 220 and generates code for rendering the selected user experience. Interface code generator 230 may access a repository of code snippets to generate the selected user experience. Each code snippet may represent a GUI element to be rendered in application 122. In some cases, each code snippet may be associated with information indicating the version of the user experience that uses the GUI element represented by the code snippet. For example, certain GUI elements, such as the overall form layout, labels for displaying the calculated result of the workflow step, and buttons for proceeding to the next step in the workflow may be common to all of the versions of the user experience. These common GUI elements may be associated with an identifier that indicating that interface code generator 230 can generate code for rendering any version of the user experience using the code snippets for the common GUI elements. Other GUI elements, such as text labels with different messages (e.g., different amounts of detail in describing how application service 130 generated the result of the workflow step) may be associated with a specific version of the user experience. To generate the user interface for a selected user experience, interface code generator can obtain the common code snippets and the code snippets associated with the selected user experience from the code repository and combine the obtained code snippets into a single set of code for rendering the GUI elements in application 122. Interface code generator 230 may then transmit the rendering code to application 122, which parses the rendering code and renders the selected version of the user experience on user device 120.

Figure 3:
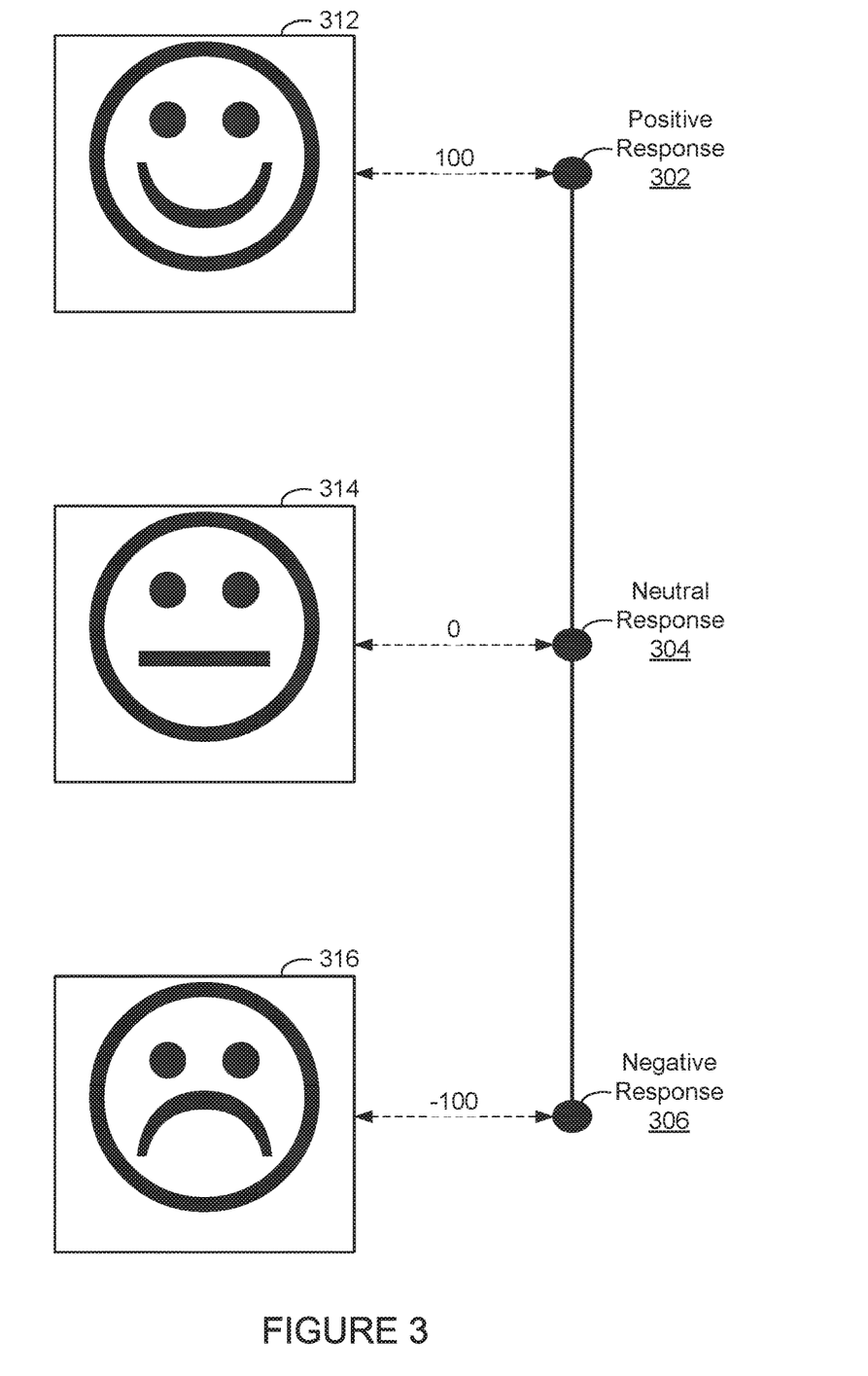
FIG. 3 illustrates example emotional response scoring based on a captured image, according to one embodiment.

FIG. 3 illustrates an example scoring system for determining an emotional response to the results of a workflow step displayed in application 122, according to an embodiment. As illustrated, the scoring system ranges from a maximum negative value of −100 to a maximum positive value of +100. Application 122 and/or emotional response analyzer 132 can receive image 312 from camera 124 and detect, based on facial characteristics in the image, that the user is pleased with the results displayed for the workflow step and assign image 312 a score commensurate with a positive response 302 for the user (which, as discussed above, may be based, at least in part, on a model generated for the user to account for differences in an amount of facial characteristics that a user displays for different emotional responses). If application 122 and/or emotional response analyzer 132 receives image 314, the application 122 and/or emotional response analyzer 132 can determine that the image shows little or no change in facial characteristics relative to a neutral facial expression. Based on the limited amount of changes in facial characteristics relative to a neutral facial expression, application 122 and/or emotional response analyzer 132 can assign image 314 a score commensurate with a neutral response 304. Likewise, if application 122 and/or emotional response analyzer 132 receives image 316, the application 122 and/or emotional response analyzer 132 can detect facial characteristics in the image indicating that the user is unhappy with the results displayed for the workflow step. In such a case, application 122 and/or emotional response analyzer 132 can assign image 316 a score commensurate with a negative response 306.

Figure 4:
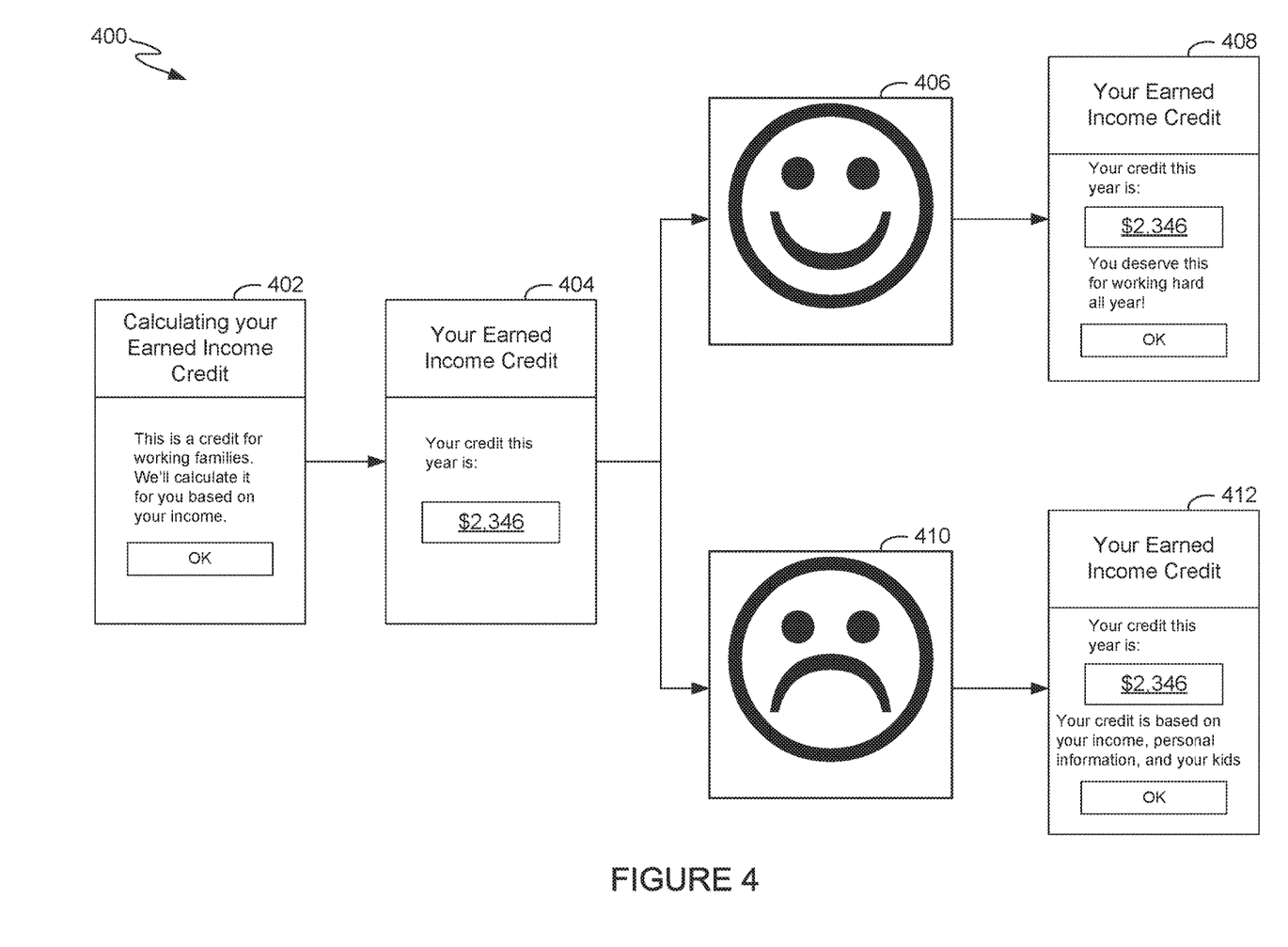
FIG. 4 illustrates an example workflow for generating user interface elements in a tax preparation application based on a detected emotional response, according to one embodiment.

FIG. 4 illustrates an example sequence 400 of graphical user interfaces (GUIs) displayed to a user based on the user's emotional response to entitlement to an amount of a tax credit, according to an embodiment. As illustrated, sequence 400 begins with application 122 displaying initial screen 402. Initial screen 402, as illustrated, may provide information about the workflow step that the user is about to complete. For example, as illustrated, sequence 400 may be configured to calculate a user's entitlement to the Earned Income Tax Credit, and screen 402 may provide a brief description of what the credit is and what application 122 will do to complete this step of the workflow. In some cases, application 122 may receive code for rendering screen 402 from application service 130 with an indication that application 122 is to begin capturing images of the user in the background in preparation for a triggering event (e.g., when application 122 displays screen 404).

Screen 404 illustrates the calculated results of the workflow step described in screen 402. As illustrated, in sequence 400, screen 404 displays the amount of the user's entitlement to the Earned Income Tax Credit. In some cases, displaying screen 404 may be a triggering event for which application 122 obtains an image of the user from camera 124 and analyzes the image of the user to determine the user's emotional response. For example, if application 122 obtains image 406, which may be scored as a positive emotional response, application 122 can transmit a positive emotional response score to application service 130. In response to the positive emotional response score, application service 130 can generate screen 408 and transmit the code for rendering screen 408 to user device 120, where screen 408 is rendered by application 122. Screen 408, as illustrated, may include text corresponding to the user's positive emotional response.

In contrast, if application 122 obtains image 410 from camera 124, application 122, application 122 can determine that the user displayed a negative emotional response to the result of the workflow displayed in screen 404. Application 122 can generate a negative emotional response score and transmit the negative emotional response score to application service 130. In response, application service 130 can generate screen 412 and transmit the code for rendering screen 412 to user device 120 for rendering by application 122. As illustrated, screen 412 may include information explaining why the user received the result of the workflow illustrated in screen 404 (e.g., why the amount of the Earned Income Tax Credit the user is entitled to is less than what the user expected to receive). In some cases, as discussed above, screen 412 may include additional user interface components that provide additional explanation for the results generated by the workflow, such as links to other explanatory data, the calculations performed by application 122, communications interfaces for textual, audio, and/or video communications, and the like.

Figure 5:
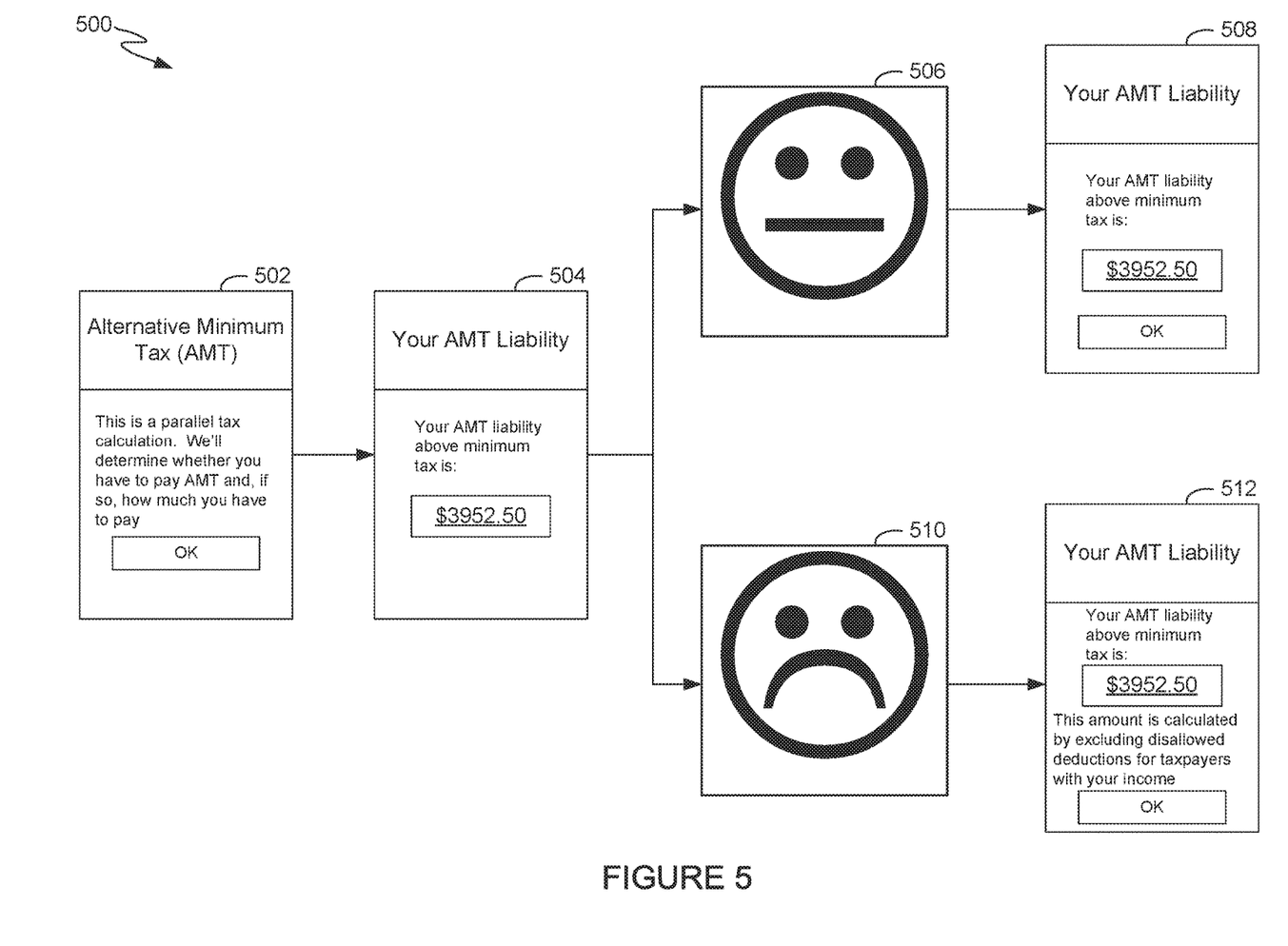
FIG. 5 illustrates an example workflow for generating user interface elements in a tax preparation application based on a detected emotional response

FIG. 5 illustrates another example sequence 500 of screens that can be displayed in application 122 based on a user's emotional response to the results of a workflow, according to an embodiment. As illustrated, sequence 500 may be part of a workflow step that determines whether a user is subject to additional tax (e.g., subject to taxation under the Alternative Minimum Tax). Sequence 500 may begin with the display of initial screen 502, which provides information about the Alternative Minimum Tax and informs the user that application 122 (and/or application service 130) will be determining whether the user is subject to additional tax. As noted above with respect to FIG. 4, code for rendering the initial screen 502 may be received from application service 130 with an indication that that application 122 is to begin capturing images of the user in the background in preparation for a triggering event (e.g., when application 122 displays screen 504, which includes information about whether the user is subject to additional tax and, if so, the amount of additional tax the user is liable for).

Screen 504 illustrates the calculated results of the workflow step described in screen 502. As illustrated, in sequence 500, screen 504 displays the amount of the user's additional tax liability due to being subject to the Alternative Minimum Tax. In some cases, the display of screen 504 may be a triggering event for which application 122 obtains an image of the user from camera 124 and analyzes the image of the user to determine the user's emotional response.

If application 122 receives image 506 from camera 124, application 122 can determine that the user displayed a neutral response to the Alternative Minimum Tax calculation displayed in screen 504. In response, application service 130 can generate screen 508, which adds a button to the screen 504 to allow the user to proceed to the next step in the workflow. In some cases, detecting a positive emotional response from a received image may additionally cause application service 130 to generate screen 508.

Otherwise, application 122 receives image 510 from camera 124, which indicates that the user has displayed a negative emotional response to the Alternative Minimum Tax calculation. In response, application service 130 can generate screen 512, which adds information about why the user has to pay additional taxes. In some cases, application service 130 can further generate additional GUI elements in screen 512 that, for example, displays web content related to the AMT calculation, displays the AMT calculation itself, provides for live communications with support personnel who can explain why sequence 500 resulted in the calculated AMT liability, and so on.

Figure 6:
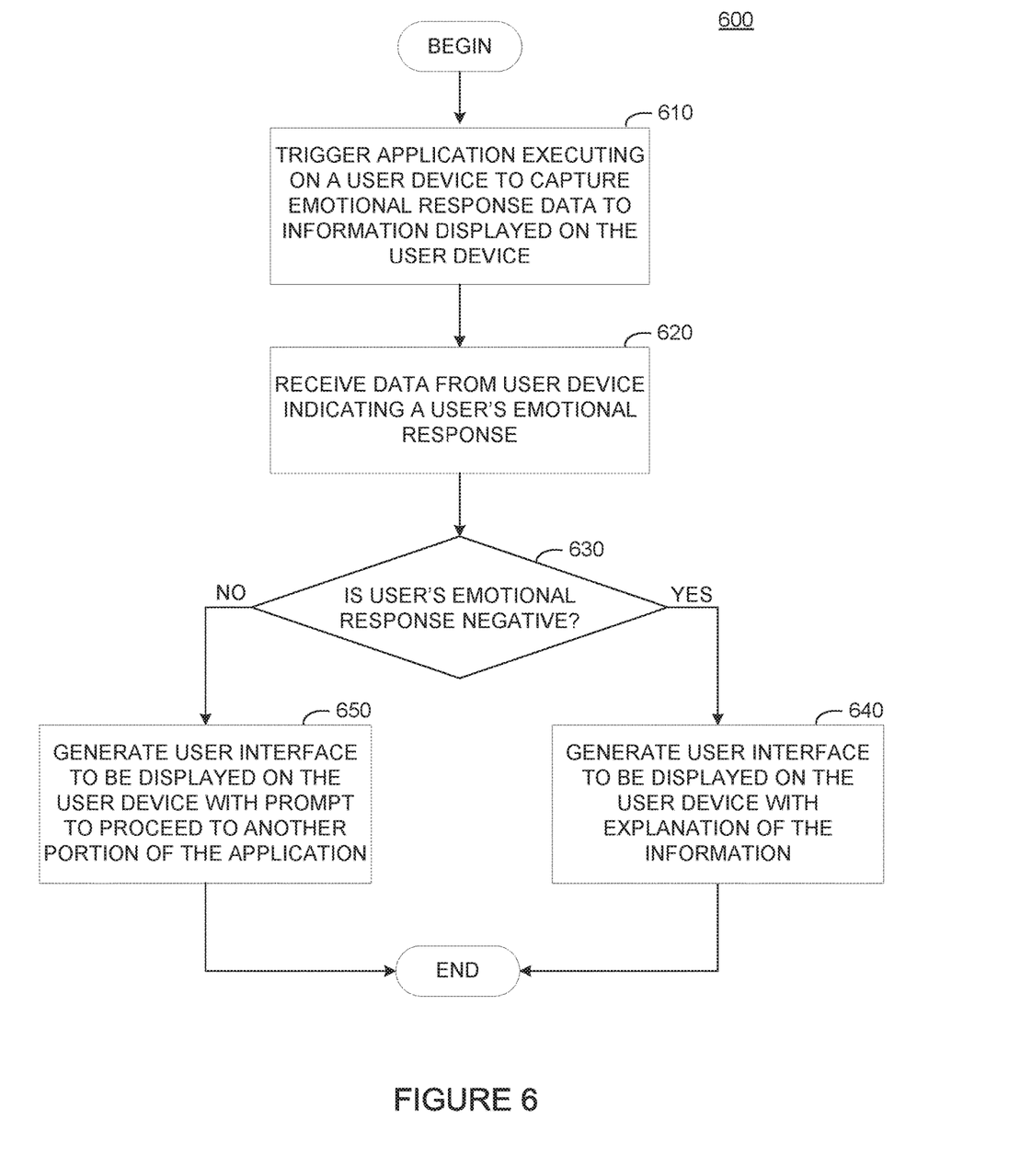
FIG. 6 illustrates example operations for dynamically generating a user interface based on a detected emotional response of a user in response to a triggering event, according to one embodiment.

FIG. 6 illustrates example operations that may be performed by an application service 130 to generate a user interface in response to emotional response data associated with a user, according to one embodiment. As illustrated, operations 600 begin at step 610, where the application service 130 triggers an application executing on a user device to capture emotional response data to information displayed on the user device. A triggering event that causes an application to capture emotional response data may include, for example, generation of one or more screens illustrating the results of a calculation in a step of a workflow (e.g., in a tax preparation application, screens illustrating a calculated entitlement to a tax grant or a calculated tax liability). In some cases, the triggering event may be received after another trigger that causes application 122 to begin capturing images of a user before application 122 displays the results of a calculation from completing a step of the workflow.

At step 620, application service 130 receives data from the user device indicating a user's emotional response. As discussed, application service 130 may, in some cases, receive a numerical score indicating whether the user's detected emotional response to the results from completing the step of the workflow are positive, negative, or neutral (e.g., on a −100 to +100 point scale, where negative scores indicate negative emotional responses and positive scores indicate positive emotional responses). In some cases, application service 130 can receive an image of the user captured in response to the triggering event. In such a case, application service 130 can process the image to identify the user's emotional response to the data displayed in application 122 and generate a score representative of the user's emotional response. In some cases, application service 130 can receive facial recognition data from application 122 to process and generate a score indicating the user's emotional state. In such a case, application service 130 need not receive the image of the user captured in response to the triggering event. The facial recognition data may include, for example, codes identifying facial regions that have moved relative to a baseline expression and an indication of an intensity of the movement. Based on the identified facial regions and the intensity of the movement, application service 130 can generate a score representative of the user's emotional response.

At step 630, application service 130 determines if the user displayed a negative emotional response to the result of the workflow step displayed in application 122. If the user displayed a negative emotional response, at step 640, application service 130 generates a user interface to be displayed on the user device with an explanation of the information displayed on the user device. As discussed above, the explanation may include textual content, links to web content, a detailed description of how application service 130 generated the result of the workflow step, interactive content, components for a live support session with another person, and so on. Application service 130 may transmit the code for rendering the generated user interface to application 122 executing on user device 120 to display the generated user interface to the user.

If, at step 630, application service determines that the user's emotional response is not negative (e.g., is neutral or positive), at step 650, application service 130 generates a user interface to be displayed on the user device with a prompt to proceed to another portion of the application. In some cases, application service 130 may generate the user interface with additional GUI elements commensurate with the user's emotional response. As discussed above, application service 130 may transmit code for rendering the generated user interface to application 122 to display the generated user interface to the user.

Figure 7:
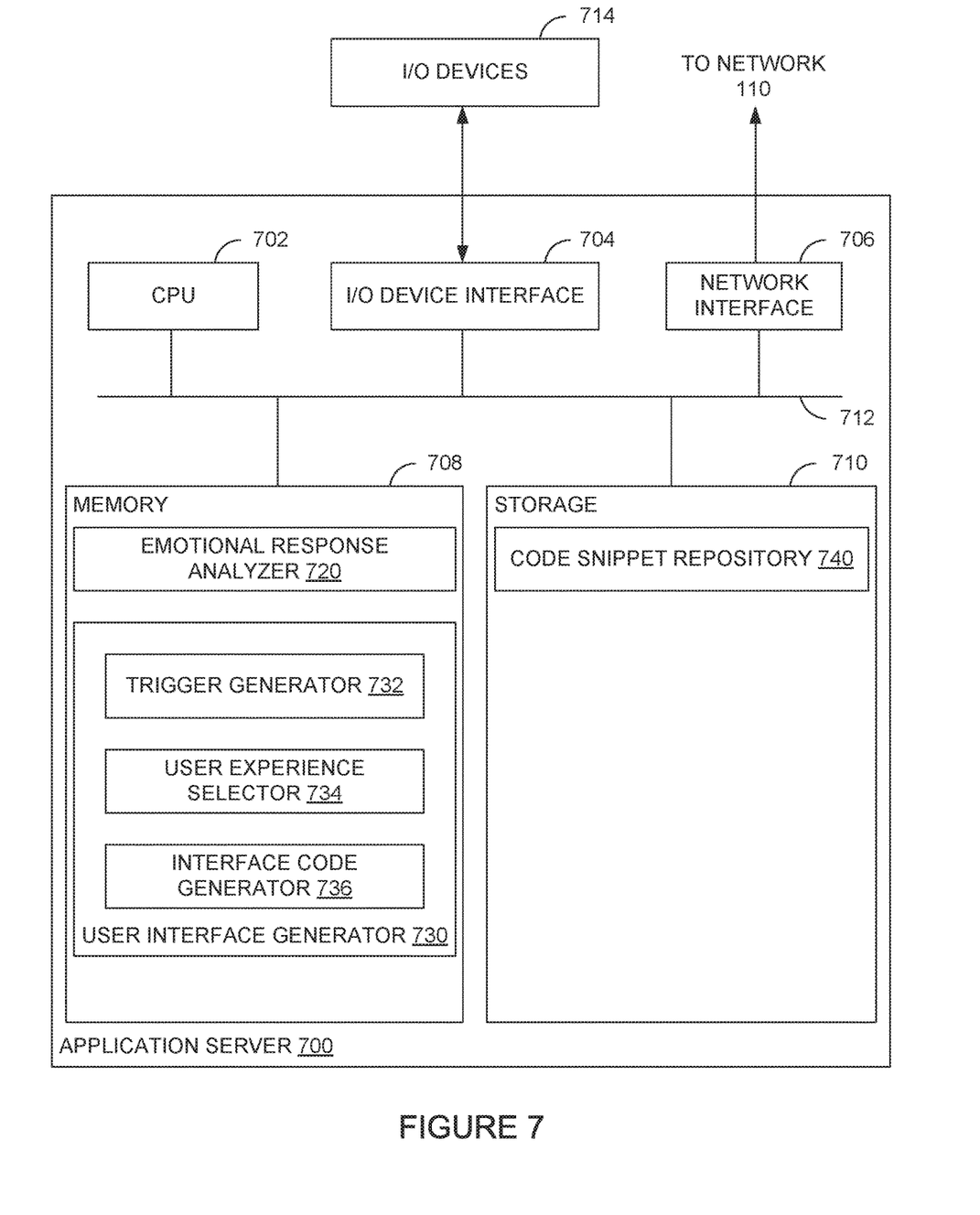
FIG. 7 illustrates an example computing system for dynamically generating a user interface based on a detected emotional response of a user in response to a triggering event, according to one embodiment.

FIG. 7 illustrates an application server 700 that uses emotional response information to dynamically generate different versions of a user interface, according to an embodiment. As shown, the system 700 includes, without limitation, a central processing unit (CPU) 702, one or more I/O device interfaces 704 which may allow for the connection of various I/O devices 714 (e.g., keyboards, displays, mouse devices, pen input, etc.) to the system 700, network interface 706, a memory 708, storage 710, and an interconnect 712.

CPU 702 may retrieve and execute programming instructions stored in the memory 708. Similarly, the CPU 702 may retrieve and store application data residing in the memory 708. The interconnect 712 transmits programming instructions and application data, among the CPU 702, I/O device interface 704, network interface 706, memory 708, and storage 710. CPU 702 is included to be representative of a single CPU, multiple CPUs, a single CPU having multiple processing cores, and the like. Additionally, the memory 708 is included to be representative of a random access memory. Furthermore, the storage 710 may be a disk drive, solid state drive, or a collection of storage devices distributed across multiple storage systems. Although shown as a single unit, the storage 710 may be a combination of fixed and/or removable storage devices, such as fixed disc drives, removable memory cards or optical storage, network attached storage (NAS), or a storage area-network (SAN).

As shown, memory 708 includes emotional response analyzer 720 and user interface generator 730. Emotional response analyzer 720, as discussed above, can receive an image or other raw data regarding a user's emotional response to a triggering event in application 122 and can determine whether the user displayed a negative emotional response, a positive emotional response, or a neutral emotional response to the displayed data. In some cases, emotional response analyzer 720 can generate a score to represent the user's emotional response to the displayed data. The score, as discussed, may use negative numbers to represent negative emotional responses and positive numbers to represent positive emotional responses.

User interface generator 730 generally uses the emotional response data received from application 122 executing on a user device 120 and/or emotional response analyzer 720 to determine which version of the user experience a user should receive and dynamically generate code for rendering the selected user interface, according to some embodiments. As illustrated, user interface generator 730 includes trigger generator 732, user experience selector 734, and interface code generator 736. Trigger generator 732 may monitor the user's progress through a workflow implemented by application server 700 and identify events for which application 122 is to monitor a user's emotional response. These events may be associated with, for example, places in a workflow where a user is presented with the results of a portion of the workflow (e.g., in a tax preparation application, locations in the workflow where a user is presented with information about the user's eligibility for significant tax credits or ineligibility for various tax deductions).

User experience selector 734 generally uses the emotional response information provided to application service 700 from application 122 and/or emotional response analyzer 720 to determine which version of a user interface to display to a user. As discussed above, user experience selector 734 may establish a one or more threshold scores that user experience selector 734 can compare to the emotional response information received from application 122 and/or emotional response analyzer 720. Generally, for n different versions of a user experience, user experience selector 734 can define n−1 threshold scores to use in determining which version of a user experience (and which version of the corresponding user interface) to present to a user. For example, a single threshold score can be defined for a system that selects from a set of two user experiences to display to a user (e.g., a first version of the user interface generated in response to a negative emotional response and a second version of the user interface generated in response to a neutral or positive emotional response to the data presented to the user). In some cases, multiple threshold scores may be generated for different degrees of a negative or positive emotional response to data presented to the user. For example, a plurality of threshold scores may be defined for negative emotional responses. Less negative emotional responses (e.g., emotional responses with scores closer to a neutral emotional response) may cause user experience selector 734 to select a version of the user experience to display to a user that includes a brief explanation of why application service generated the displayed result. More intense negative emotional responses may be associated with user experiences that provide more detail about the data displayed in application 122, such as links to web content or a live communications interface that allows the user to interact, in real time, with support personnel who can explain the calculated results of the workflow step.

Interface code generator 736 generally uses the selection of user experience selector to generate the code for rendering a user interface associated with the selected user experience and transmits the generated code to application 122 for processing and rendering on user device 120. As discussed, interface code generator 736 can retrieve code defining various GUI components from a repository, such as code snippet repository 740 in storage 710, to generate the code for rendering the user interface associated with the selected user experience. In some cases, interface code generator 736 can retrieve, from the code snipped repository, code for components shared across different versions of the user experience and code defining GUI components specific to the selected user experience. Interface code generator 736 consolidates the retrieved code snippets into a single piece of code defining the user interface and transmits the definition of the user interface to user device 120 for processing.

As shown, storage 710 includes a code snippet repository 740. Code snippet repository 740 generally includes code defining a plurality of graphical user interface components that interface code generator 736 can retrieve and use to generate a selected user interface, as discussed above. Each of the code snippets stored in snippet repository 740 may include an indication of the user interfaces that include the components. In some cases, code snippets associated with common components (e.g., components included in all of the user experiences) may be associated with an indication that the code snippets are not associated with a particular user experience (e.g., a wildcard character). Other GUI elements that may be associated with specific versions of a user experience may be associated with indications of the user experience(s) that include these GUI elements (e.g., user experience indices associated with the each of the threshold scores).

Advantageously, by monitoring the emotional response of a user to the results of a step in a workflow, applications and application services can dynamically generate user interfaces in response to the user's emotional response. User interfaces need not be hard-coded and generated in the absence of emotional response data. As described herein, user interfaces may be dynamically generated to include graphical user interface elements that correspond to the user's emotional response, for example, to explain how the results of a step in a workflow were calculated and automatically address a user's emotional response (e.g., explaining why completing the workflow generated a result that was worse than an expected result).

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A method, comprising:
   executing a triggering event in a software application, the triggering event comprising generation of a result for a step in a workflow;
   in response to execution of the triggering event, transmitting a command to a client device to obtain an image of a facial expression of a user of the software application;
   receiving the image of the facial expression of the user of the software application from the client device;
   determining an emotional response score for the user of the software application based on the image of the facial expression of the user of the software application;
   identifying a version of a user experience from a set of versions of the user experience comprising at least a first plurality of user experiences corresponding to different ranges of negative emotional response scores and a second plurality of user experiences corresponding to different ranges of positive emotional response scores to present on the client device based on the determined emotional response score for the user of the software application, wherein:
      each version of the set of versions is associated with a range of emotional response scores and is configured to present information related to the generated result,
      versions associated with ranges of negative emotional response scores in the set of versions include information explaining how the result of the step in the workflow was calculated,
      versions associated with ranges of positive emotional response scores in the set of versions include messages corresponding to a positive emotional response to the result of the step in the workflow, and
      the identified version of the user experience has a range of emotional response scores containing the determined emotional response score;
   generating code for rendering a user interface associated with the identified version of the user experience; and
   transmitting the generated code to the client device for rendering and presentation on the client device.

2. The method of claim 1, wherein the triggering event comprises displaying a result of a step in a workflow on the client device.

3. The method of claim 1, wherein the emotional response score comprises a score indicative of an emotional response of the user.

4. The method of claim 1, wherein identifying the version of the user experience to present on the client device comprises:
   comparing the determined emotional response score to a plurality of threshold emotional responses; and
   selecting a version of the user experience associated with the threshold emotional response of the plurality of threshold emotional responses which is closest to the determined emotional response score.

5. The method of claim 1, wherein identifying the version of the user experience to present on the client device comprises:
   selecting a first version of the user experience to present on the client device upon identifying that the determined emotional response score is associated with a positive emotional response; and
   selecting a second version of the user experience to present on the client device upon identifying that the determined emotional response score is associated with a negative emotional response.

6. The method of claim 5, wherein the second version of the user experience comprises one or more graphical user interface (GUI) components containing information explaining a result of completing a step in a workflow.

7. The method of claim 5, wherein the second version of the user experience comprises one or more graphical user interface (GUI) components for initiating an interactive support session with another person.

8. A system, comprising:
a processor; and
memory having instructions stored thereon which, when executed by the processor, performs an operation for generating a user interface based on an emotional state of a user, the operation comprising:
  executing a triggering event in a software application, the triggering event comprising generation of a result for a step in a workflow;
  in response to execution of the triggering event, transmitting a command to a client device to obtain an image of a facial expression of a user of the software application;
  receiving the image of the facial expression of the user of the software application from the client device;
  determining an emotional response score for the user of the software application based on the image of the facial expression of the user of the software application;
  identifying a version of a user experience from a set of versions of the user experience comprising at least a first plurality of user experiences corresponding to different ranges of negative emotional response scores and a second plurality of user experiences corresponding to different ranges of positive emotional response scores to present on the client device based on the determined emotional response score for the user of the software application, wherein:
    each version of the set of versions is associated with a range of emotional response scores and is configured to present information related to the generated result,
    versions associated with ranges of negative emotional response scores in the set of versions include information explaining how the result of the step in the workflow was calculated,
    versions associated with ranges of positive emotional response scores in the set of versions include messages corresponding to a positive emotional response to the result of the step in the workflow, and
    the identified version of the user experience has a range of emotional response scores containing the determined emotional response score;
  generating code for rendering a user interface associated with the identified version of the user experience; and
  transmitting the generated code to the client device for rendering and presentation on the client device.

9. The system of claim 8, wherein the emotional response score comprises a score indicative of an emotional response of the user.

10. The system of claim 8, wherein identifying the version of the user experience to present on the client device comprises:
  comparing the determined emotional response score to a plurality of threshold emotional responses; and
  selecting a version of the user experience associated with the threshold emotional response of the plurality of the threshold emotional responses which is closest to the determined emotional response score.

11. The system of claim 8, wherein identifying the version of the user experience to present on the client device comprises:
  selecting a first version of the user experience to present on the client device upon identifying that the determined emotional response score is associated with a positive emotional response; and
  selecting a second version of the user experience to present on the client device upon identifying that the determined emotional response score is associated with a negative emotional response.

12. The system of claim 11, wherein the second version of the user experience comprises at least one of:
  one or more graphical user interface (GUI) components containing information explaining a result of completing a step in a workflow; or
  one or more GUI components for initiating an interactive support session with another person.

13. A non-transitory computer readable medium having instructions stored thereon which, when executed by a processor, performs an operation for generating a user interface based on an emotional state of a user, the operation comprising:
  executing a triggering event in a software application, the triggering event comprising generation of a result for a step in a workflow;
  in response to execution of the triggering event, transmitting a command to a client device to obtain an image of a facial expression of a user of the software application;
  receiving the image of the facial expression of the user of the software application from the client device;
  determining an emotional response score for the user of the software application based on the image of the facial expression of the user of the software application;
  identifying a version of a user experience from a set of versions of the user experience comprising at least a first plurality of user experiences corresponding to different ranges of negative emotional response scores and a second plurality of user experiences corresponding to different ranges of positive emotional response scores to present on the client device based on the determined emotional response score for the user of the software application, wherein:
    each version of the set of versions is associated with a range of emotional response scores and is configured to present information related to the generated result,
    versions associated with ranges of negative emotional response scores in the set of versions include information explaining how the result of the step in the workflow was calculated,
    versions associated with ranges of positive emotional response scores in the set of versions include messages corresponding to a positive emotional response to the result of the step in the workflow, and
    the identified version of the user experience has a range of emotional response scores containing the determined emotional response score;
  generating code for rendering a user interface associated with the identified version of the user experience; and
  transmitting the generated code to the client device for rendering and presentation on the client device.

14. The non-transitory computer readable medium of claim 13, wherein the emotional response score comprises a score indicative of an emotional response of the user.

15. The non-transitory computer readable medium of claim 14, wherein identifying the version of the user experience to present on the client device comprises:
  comparing the determined emotional response score to a plurality of threshold emotional responses; and
  selecting a version of the user experience associated with the threshold emotional response of the plurality of the threshold emotional responses which is closest to the determined emotional response score.

16. The non-transitory computer readable medium of claim 15, wherein identifying the version of the user experience to present on the client device comprises:

selecting a first version of the user experience to present on the client device upon identifying that the determined emotional response score is associated with a positive emotional response; and selecting a second version of the user experience to present on the client device upon identifying that the determined emotional response score is associated with a negative emotional response.

17. The non-transitory computer readable medium of claim 16, wherein the second version of the user experience comprises at least one of:

one or more graphical user interface (GUI) components containing information explaining a result of completing a step in a workflow; or one or more GUI components for initiating an interactive support session with another person.

18. The system of claim 8, wherein the triggering event comprises displaying a result of a step in a workflow on the client device.

19. The non-transitory computer readable medium of claim 16, wherein the triggering event comprises displaying a result of a step in a workflow on the client device.

20. The method of claim 1, wherein determining the emotional response score from the image of the facial expression of the user of the software application comprises comparing the image of the user's facial expression against a previously trained model for emotional responses of the user.

* * * * *